No. 696,952. Patented Apr. 8, 1902.
W. S. EATON.
ENGRAVING MACHINE.
(Application filed Nov. 23, 1899. Renewed Jan. 28, 1902.)

(No Model.) 7 Sheets—Sheet 3.

WITNESSES
Norris A. Clark.
Emma W. Finlayson.

INVENTOR
William S. Eaton
by Stewart & Stewart
his ATT'Ys

No. 696,952. Patented Apr. 8, 1902.
W. S. EATON.
ENGRAVING MACHINE.
(Application filed Nov. 23, 1899. Renewed Jan. 28, 1902.)
(No Model.) 7 Sheets—Sheet 5.

WITNESSES
INVENTOR

No. 696,952. Patented Apr. 8, 1902.
W. S. EATON.
ENGRAVING MACHINE.
(Application filed Nov. 23, 1899. Renewed Jan. 28, 1902.)

(No Model.) 7 Sheets—Sheet 6.

WITNESSES
Norris A. Clark.
Emma W. Finlayson.

INVENTOR
William S. Eaton
by Stewart & Stewart
his ATT'YS

No. 696,952. Patented Apr. 8, 1902.
W. S. EATON.
ENGRAVING MACHINE.
(Application filed Nov. 23, 1899. Renewed Jan. 28, 1902.)

(No Model.) 7 Sheets—Sheet 7.

WITNESSES
Norris H. Clark.
Emma W. Finlayson.

INVENTOR
William S. Eaton
by Stewart & Stewart
his ATT'Ys

UNITED STATES PATENT OFFICE.

WILLIAM S. EATON, OF SAG HARBOR, NEW YORK.

ENGRAVING-MACHINE.

SPECIFICATION forming part of Letters Patent No. 696,952, dated April 8, 1902.

Application filed November 23, 1899. Renewed January 28, 1902. Serial No. 91,557. (No model.)

*To all whom it may concern:*

Be it known that I, WILLIAM S. EATON, a citizen of the United States of America, and a resident of Sag Harbor, county of Suffolk, State of New York, have invented certain new and useful Improvements in Engraving-Machines, of which the following is a specification.

My invention relates to an improvement in engraving-machines, of which the following is a specification.

The improvement in engraving, tracing, or ornamenting machines forming the subject of this invention involves generally the application of the principle of the pantograph; and it consists, specifically, in a novel construction and arrangement of parts whereby such principle is utilized to its fullest extent in the production of a machine adapted to form singly or in multiple or gang-work various kinds of engraving, tracing, or ornamenting work, one feature of the invention being that both the sample from which tracing or copying is being made and the reproduced tracing are in a convenient position to be observed by the operator.

By the construction and arrangement of parts hereinafter described I am able to provide a pantograph system with universal joints and universal movements, which are so perfect in their relation to each other as to take up the lost and irregular motion which is present in many machines and make a more perfect reproduction than has heretofore been possible. I also provide means for adjusting the relation of the leverage by changing the points of fulcrum, thus producing variable results at will. These fulcrums are capable of such adjustment as to bring them to a zero position, or they may be varied from the zero position to any required extent within the limits of the size of the machine. I am able also by the arrangement to multiply the number of reproductions to be made without limit.

In the present machine I have indicated an arbitrary number or tools in operation; but this is entirely arbitrary. It may be multiplied to any extent desired.

In the operation of my machine all of the movements are at right angles and in a horizontal plane.

It will be understood that under the pantograph system the relation between the tracer and the engraving-tool as regards the relative movement of the two is dependent upon the degree of leverage. Where the levers are so arranged as to fulcrum in the same plane, of course there will be no movement, and this I term the "zero position." The degree of the movement away from this zero position will determine the magnitude of the reproduction between the tracer and the engraving-tool.

I have illustrated my invention in the accompanying drawings, referring to the parts by numerals, designating like parts by like numerals.

I will now proceed to describe the machine in detail.

1 is a bed-plate supporting two uprights 2 2. The bed-plate 1 is provided with ways 3, in which the tracing-table 105 is adapted to move.

Figure 7:
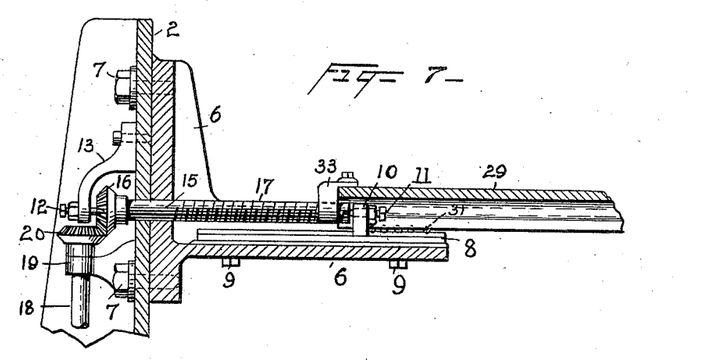
Fig. 7 is an enlarged detail view, partly in section, of the operating mechanism of the stylus-carriage.

4 4 are brackets adjustably secured to the uprights 2 by suitable means, so that they may be raised and lowered, the adjustment not being shown. On the upper surface of these brackets are provided ways 5, suitable to receive ball-bearings. 6 6$^a$ are also adjustable brackets secured to the uprights 2 2. 7 7 (shown in Fig. 7) are bolts by which these brackets are adjustably held to the uprights 2 2. Referring to Fig. 7, the construction of these brackets is illustrated.

Figure 4:
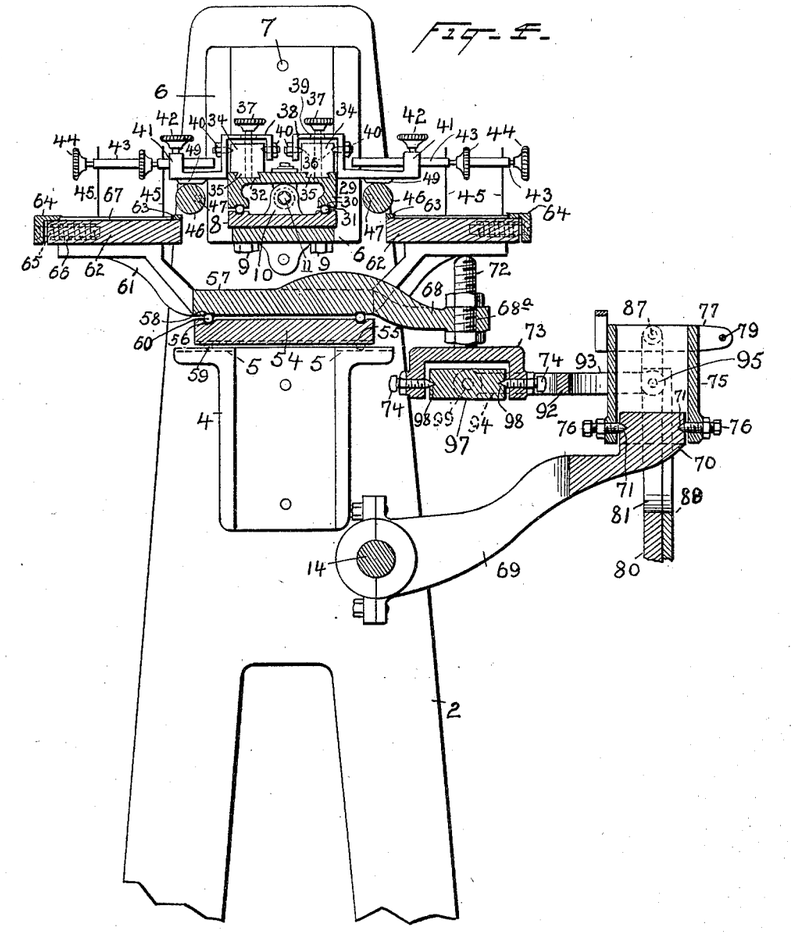
Fig. 4 is a vertical section taken on the line $x\,x$ of Fig. 2.
Figure 5:
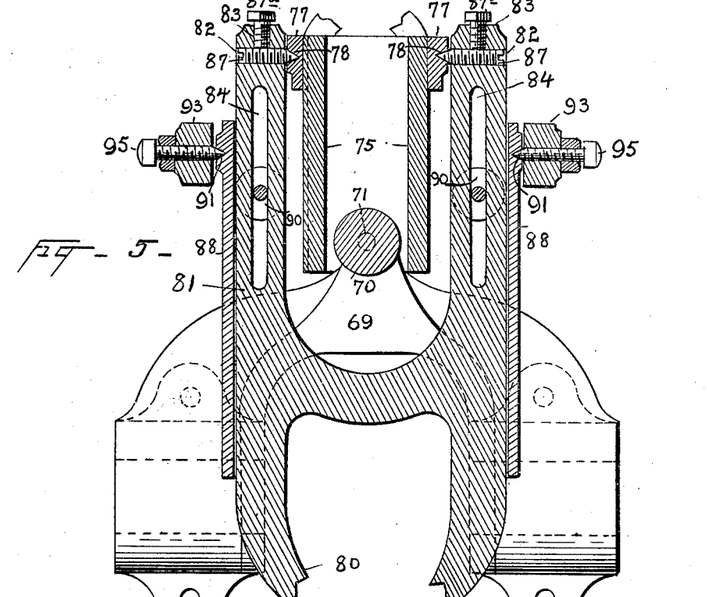
Fig. 5 is an enlarged detail view, in vertical section, of a portion of the hinged lever connection, taken on the line $z\,z$ of Fig. 2.
Figure 6:
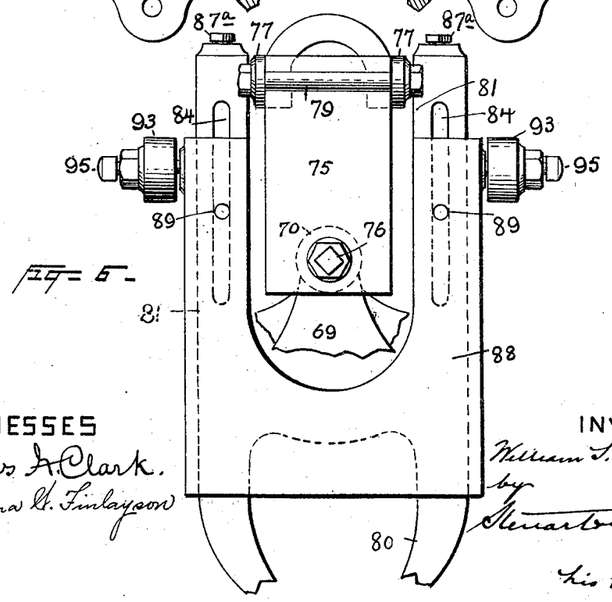
Fig. 6 is a rear view of the section shown in Fig. 5 in its entirety.

Referring now to Figs. 4 and 7, on the upper surface of the brackets 6 6$^a$ are secured plates, as 8 8, these plates being provided with grooves for ball-bearings, and these plates are secured to the brackets by the screws 9 9. Between the ball-bearing ways in the plate 8 is set and secured to the bracket 6 an upright, as 10, carrying a center-bearing point 11.

Figure 1:
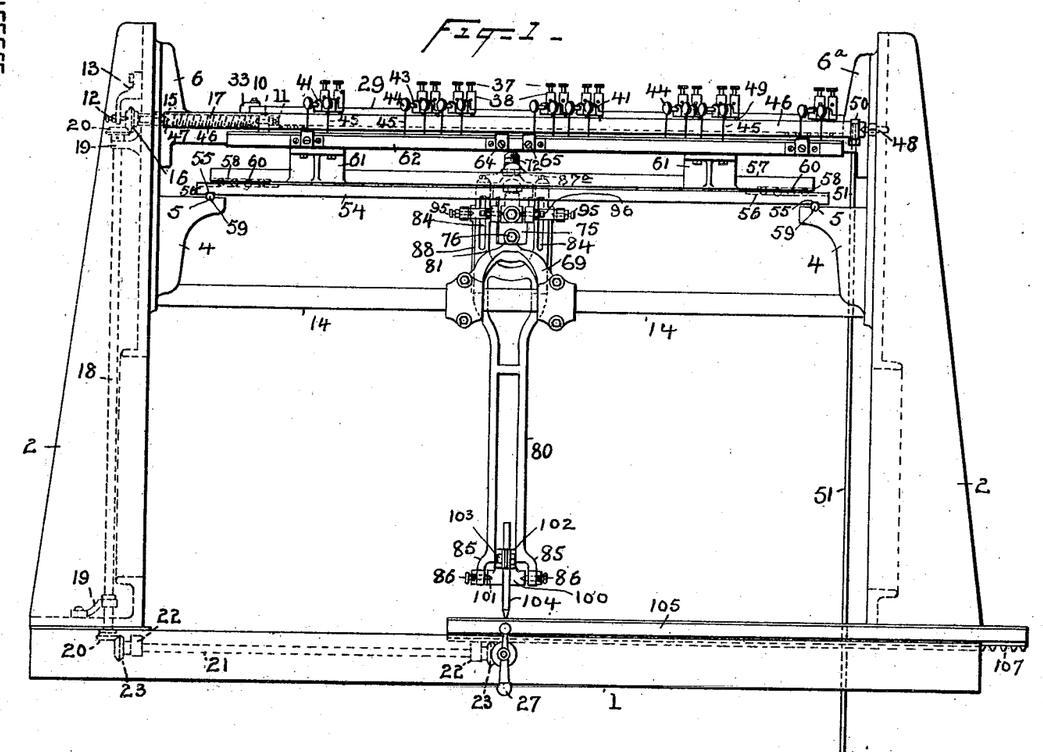
Figure 1 is a front elevation.
Figure 2:
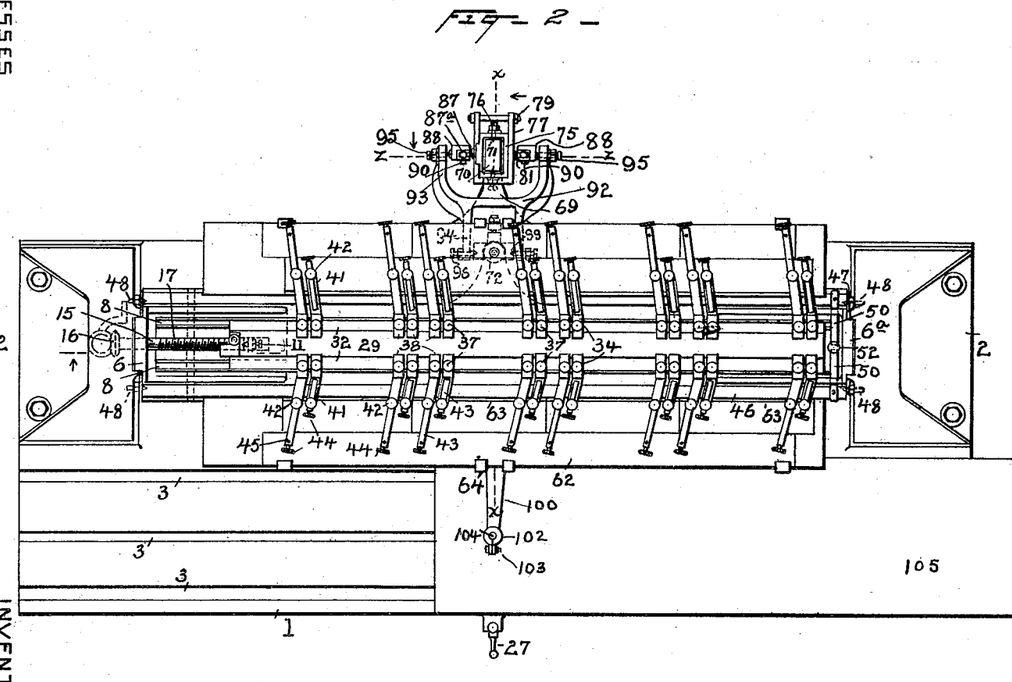
Fig. 2 is a plan view.

In Figs. 2 and 7, 13 is a bracket suitably secured to the frame 2, carrying the center-bearing point 12, and 15 is a screw-threaded shaft carrying at one end a beveled gear 16 and having two center-bearing surfaces. This shaft is mounted in these center bearings between the center-bearing points 11 and 12. I have designated the screw-thread of shaft 15 as 17. 18 is a shaft carrying at the end thereof the beveled gears 20, being mounted in the supports 19. 21 is a shaft suitably mounted in the bearings 22 and provided at either end thereof with beveled gears 23, the latter being shown in Fig. 1 in dotted lines.

Figure 3:
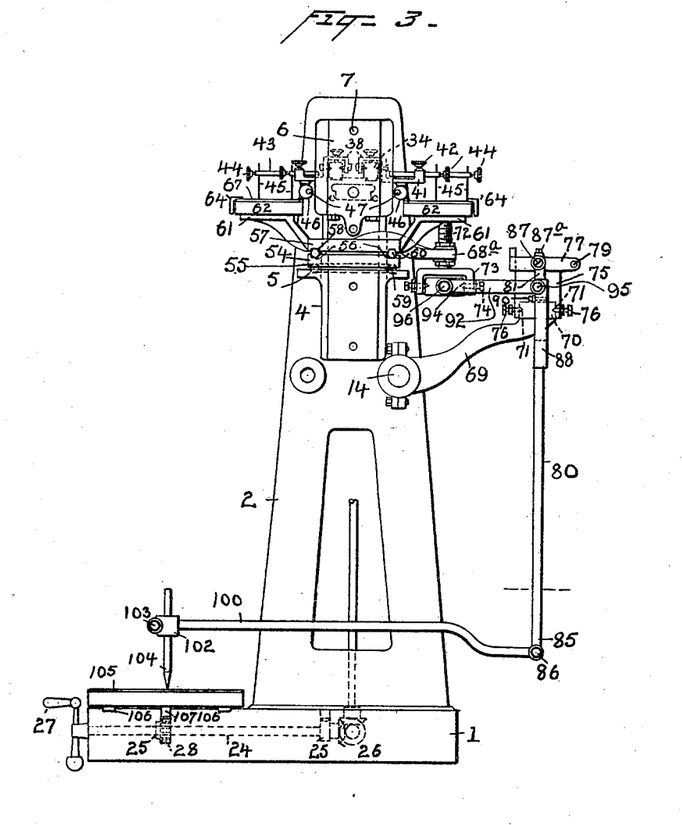
Fig. 3 is a side view in elevation with one upright 2 removed.

In Fig. 3, 24 is a shaft suitably mounted in bearings 25 and provided at one end with the beveled gear 26 and at the other end with the crank-arm 27 and carrying also the pinion 28. This line of shafting and beveled gears last described communicate to the screw-threaded shaft 15 a movement corresponding to the movement of the hand-crank 27. 105 is a pattern-table upon which the matter to be traced is secured in any suitable manner. On the under side of this table are guides 106, adapted to move in the ways 3, together with the rack 107, which is adapted to mesh with the pinion 28. It will be readily observed that with the movement of the arm 27 the pattern-table 105 and the screw-shaft 15 will move in unison, for the reason that the pinion 28 meshes with the rack 107 and the shaft 15 is geared up through the shafting described with the crank-arm 27. Later in this specification will be described the purpose of this unity of movement.

In Figs. 1, 2, and 4, 29 is a plate suspended between the brackets 6 and 6ª upon suitable ball-bearings. I term this plate the "tool-carriage," for the reason that it supports and carries these tools from one engraving position to another. The plate 29 is provided on its under side with ball-bearing ways corresponding with the ball-bearing ways in the plate 8. (Shown in Fig. 7.) By 31 I have indicated the balls between the plates 8 and 29. It will be readily seen, therefore, that this plate 29 or tool-carriage moves on the ball-bearings longitudinally of the machine. The plate 29 is provided on its upper surface with dovetailed ways 32, and secured to one end of the plate 29 is the screw-threaded bracket 33. (Shown in Fig. 7.) This bracket is screw-threaded on its under side to correspond with the screw-thread 17 of the shaft 15, and it will be readily understood that with the revolution of the shaft 15 the tool-carriage 29 will be moved backward and forward, according to the revolution of the shaft 15, for the reason that the screw-thread of the bracket and shaft correspond and work together.

Each graving-tool is mounted as follows: 34 is a block having a tongue on its under side 35, adapted to fit into the dovetailed ways 32 in the carriage 29. On the sides of each of these blocks are bearing-centers, as 36, and passing through the center of each block 34 is a set-screw, as 37. It will be readily understood that when the beveled tongue 35 is introduced into the slot 32 and the set-screw is screwed down these blocks will be locked within the beveled ways 32. The graving-tools are supported upon these blocks 34 by a pivoted supporting-arm 38, which may be described as follows: The arm 38 is at one end U-shaped, spanning the block 34, and is provided with a hole in the top, as 39, through which the set-screw 37 passes freely, the hole being sufficiently large to permit of the rocking movement of the arm 38. 40 40 are center-bearing points at either side of the U-shaped portion of the supporting-arm 38, said center-bearing points having their bearings in the bearing-centers 36 in the blocks 34. 41 is the other end of the tool-supporting arm 38, which has a set-screw 42, and 43 the tool-carrying rod adapted to pass through a hole in the head 41 to be secured therein by the set-screw 42. This tool-carrying rod 43 has a right-angular hole through the end thereof and a set-screw 44. The tool 45 passes through a hole in the end of the tool-carrying rod 43 and is secured therein by the set-screw 44. These tool-supporting arms, as will be seen in the plan view, Fig. 2, are made to project at an angle to the plane of the axis of their mounting, their movement being eccentric to the axis of the movement of these arms on their pivotal center bearings 40 40, and they are provided on their under side with a bearing-surface 49, which will be referred to hereinafter.

Figure 8:
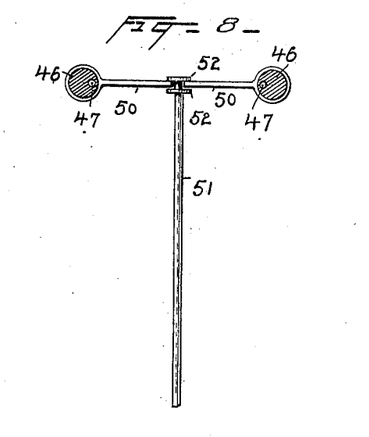
Fig. 8 is a detail view of a portion of the device for moving the engraving-stylus out of the way of the surfaces on which they bear.
Figure 9:
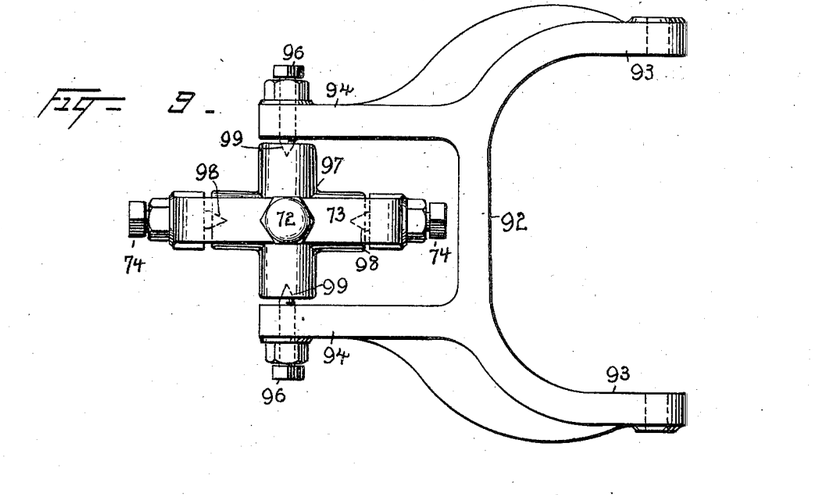
Fig. 9 is a plan view of the link connection.

The means by which the tool-supporting arms 38 are raised out of engagement with the engraving-surfaces upon which they are operating is as follows: I provide two cam-shafts, as 46 46. These cam-shafts have centers 47 eccentric to their axis, being mounted between the center-bearing points 48 48, the eccentric position of these bearing-points being illustrated in Fig. 4. In Figs. 2 and 8 I have illustrated the means by which I operate these cam-shafts. I secure to each of these cam-shafts a lever 50 50, preferably by a collar. I then provide a rod, as 51, operated, preferably, by the hand of the operator, and provide the end of this rod with a collar, as 52 52, adapted to embrace the ends of the levers 50 50. It will be readily seen that by a movement by which the rod 51 will be depressed the levers 50 50 will be drawn down and the cam-shafts 46 46 will be rocked, and in their rocking movement they will engage the under bearing-surface 49 of the tool-supporting arm 38, and in so doing the tool 45 will be lifted off of the engraving-surface upon which it is operating.

I will now proceed to describe the means by which I communicate the motion of the tracer to the plates upon which the engraving is to be performed and which operate beneath the permanent tool 45 or a multiple thereof.

5 5 are ways in the brackets 4 4, adapted to receive ball-bearings.

54 is a plate provided on its under side with ball-bearing ways 55 and on its upper side with ball-bearing ways 56, the ways in the upper and lower sides of this plate being at right angles to each other.

57 is a plate having ball-bearing ways 58 on the under side thereof corresponding to the ball-bearing ways on the upper side of the plate 54.

59 represents balls interposed between the bracket 4 and the plate 54.

60 represents balls in the ways between the plates 54 and 57.

61 61 are brackets mounted on the plate 57 and supporting the engraving-table 62.

63 represents shoulders on the rear of the engraving-table 62, against which the engraving-plate may be adjusted in the rear, and 64 is a clamp edge suitably mounted on the bolt 65 and held against the engraving-plate by the spring 66.

67 is the plate to be engraved, interposed between the clamp edge 64 and the shoulder 63, upon which the tool 45 is intended to operate.

It will be readily seen that by this system of plates superimposed one above the other with ball-bearing ways at right angles to each other a universal right-angular movement is obtained by the operation of the plate 57. I therefore connect to this plate a modified pantograph system, which I will now describe. This system is arranged and suspended from a bracket, as 69, having a head 70 with center bearings 71. Secured to the plate 57 is a bracket-arm 68. This bracket-arm 68 has a screw-threaded head 68$^a$, in which the screw-shaft 72 is secured by suitable nuts. To the screw 72 is secured a bifurcated frame, as 73, carrying center-bearing points 74 74.

75 is a frame (shown in Figs. 2, 4, 5, and 6) which forms part of one of the universal joints now to be described. This frame 75 carries two center-bearing points 76, which register with the center journal-bearings 71 in the head 70 of the bracket 69, and is made sufficiently free on said head to rock on said bearings.

77 is an adjustable collar adapted to slide on the frame 75 and to be secured thereto in a fixed position by the set-screw 79. This collar is provided on either side with center bearings 78.

Figure 10:
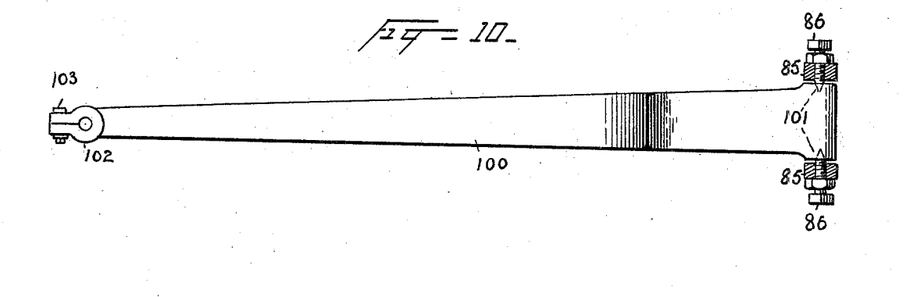
Fig. 10 is a detail view of the lever-arm at the end of which the main stylus is mounted.

80 is a suspended lever having a bifurcated upper end 81, and in such bifurcated upper end two screw-threaded apertures to receive two center-bearing screws, as at 82, and two screw-threaded apertures, as at 83, to receive set-screws adapted to bear upon and hold in position said center-bearing screws. The upper bifurcated end of this lever 80 also has in both of its arms two slots, as 84 84. At the lower bifurcated end of the suspended lever 80, which I will designate as 85, each arm carries center-bearing points 86 86, between which the tracer-arm (shown in Fig. 10) is suspended.

87 87 are center-bearing points set into the apertures 82 82 in the upper bifurcated arms of the lever 80, and 87$^a$ are set-screws to bind said center bearings 87 in position.

88 is an adjustable plate adapted to carry the link or connecting-rod between the lever 80 and the plate 57. This plate is secured to the upper bifurcated end 81 of the lever 80 by two screws, as 89, having thumb-screw heads 90. These screws pass through the slots 84 and into the plate 88, thus binding the plate 88 to the lever-arm 80, and by releasing the same this plate may be moved vertically and set in any position.

91 91 are center-bearing points in the sides of the plate 88.

92 is a connecting-link between the suspended arm 80 and the plate 57, which may be described as follows: It has two bifurcated ends the arms of which are designated as 93 93 and 94 94. The arms 93 93 carry the bearing-points 95 95 and the arms 94 94 carry the bearing-points 96 96. It will be seen, therefore, that one end of this link is pivoted to the plate 88 and the other end is pivoted to a universal bearing-block 97, having bearings 98 98 and 99 99.

100 is a tracer-arm having center bearings 101, the same being journaled between the center-bearing points 86 86, contained in the lower bifurcated arms 85 of the suspended lever 80.

102 is a spring-sleeve at the end of the tracer-arm 100, with a bolt and nut for the same 103, and 104 is the tracer, adapted to be secured within the sleeve 102.

Concerning the adjustment of my mechanism, it will be well to refer to the relations which the several operative parts may bear to each other. In the first instance the movement of the tracing-table 105 must bear to that of the tool-carriage a relation which corresponds to the proportion at which the reproduction is being accomplished by the tracing instrument and connecting apparatus. In my machine this relation is governed by the pitch of the screw 17 on the screw-shaft 15. It will be readily understood that according to the pitch of this screw so will the movement of the tool-carriage be governed. Secondly, the leverage interposed between the tracer and the tool may be adjusted by changing the points of fulcrum to suit the conditions which it is proposed to meet. To begin with, a starting-point is found by bringing all of the points of fulcrum into the same plane. Thus a zero position is found in which the tracer may be moved without affecting any of the operative parts. The degree of movement of the fulcrum of any of the parts away from this center and into other and different planes constitutes the adjustable feature of my leverage system, and by this variable adjustment I may obtain valuable results. It will be readily understood from the description already had that I may adjust these fulcrums by releasing the screw 79 and moving the collar up and down on the frame 75 and securing the same in any desired position and by releasing the screws 89 and moving the plate 88 up or down within the ways 84, and it will be understood that the movements of the tracer-lever in or parallel to the plane of Fig. 1 are performed by said lever as a lever of the first class having its fulcrum at 76, while movements in or parallel to planes of Figs. 3 and 4 are performed by said lever as a lever of the second class having its fulcrum at 87. Therefore in order that the reduced engraving shall be symmetrical and accurate the adjustments of these fulcrum-points with relation to the link 92 must be extremely accurate in order that the operations of the lever in the respective planes may be absolutely in the same proportion as one is to fifty, for instance.

It is unnecessary for me to explain in detail the variety of sizes and forms of reproduction which I may obtain by varying the points of fulcrum as last described. It is manifest that I may modify the machine so as to produce by the operation of the tracer an enlarged figure by changing the position of the fulcrum of the lever 80 so that the long arm is connected to the link 92. The present apparatus is constructed for the reproduction of a reduced figure.

The points of fulcrum above referred to may be seen by reference to the center-bearing points, (designated as follows: 76, 87, and 95,) and when I refer to bringing the fulcrum-points into the same plane I mean bringing these center-bearing points into the same plane, and when I refer to moving the fulcrum-points out of the same plane I mean moving the center-bearing points so as to change the relative position of the points of fulcrum to a point, as for illustration, according to the position and proportion indicated in the drawings submitted herewith, which I will assume is one to fifty.

The operation of my machine is as follows: I first determine the relative size to which I desire to reduce the tracing to be reproduced. I will assume for the sake of illustration the proportion is as one is to fifty. This being assumed, it will be necessary to introduce into the machine a screw-shaft 15, having a screw-thread 17, which will bear to the rack 107 the same relation, that is to say, as one is to fifty. Then it will be understood that with the operation of the crank-arm 27 through the medium of the shaft and between the gear and screw-shaft 15 and bracket 33 the tracer-carriage 29 will be moved coincident with the pattern-table 105 a degree of movement equal to one-fiftieth of the movement of the tracing-table 105. Of course the proportion due to the pitch of the screw and the proportion of the long and short arms of the lever 80 should be identical—as, for instance, as here assumed to be one to fifty. The pattern-table is moved from one position to another when it is necessary to bring the tracer into a field of operation. In the operation of my machine the tools 45 rest permanently upon the surface to be engraved, and therefore it will be manifest that any movement of the tracer-table laterally will cause the engraving-styluses to affect the surface to be engraved. Therefore it is necessary before the lateral movement of the stylus-carriage takes place that all of the styluses should be removed from contact with the surface to be engraved or traced. I accomplish this result by depressing the lever 51, preferably by a foot movement, thus causing the depression of the levers 50 50 and the rocking of the cam-shafts 46 46, which in their rocking movement engage the contact-point 49 of the stylus-carrying arm 38, and as this bearing is eccentric to the axis of the pivoted mounting of the stylus-arm 38 these arms are caused to rock and in so doing to lift the styluses 45 off of the surface to be engraved, and they are maintained in this position until the operation of moving the stylus-carriage is accomplished, and then the lever 51 is released and the engraving-styluses resume their normal operative position. It is necessary to perform this operation when it is desired to pass from one operative surface to another—as, for instance, where the tracing of one letter has been accomplished and it is desired to bring another letter into the field of operation of the tracer and to transfer the engraving-stylus from the field of its operation to another field without tracing a line between the letters. It will therefore be clear that when the operator has depressed the rod 51 he can then proceed to operate the crank 27 until the tracer 104 is brought into operative relation with the object to be traced. The operation of this is also to move the engraving-tool carriage so as to bring the engraving instrument into a corresponding position. The rod 51 is then released and the engraving instrument is brought in contact with the engraving-surface and the tracer may be moved over the surface to be traced.

In performing the operation of tracing, as heretofore stated, the pattern or design to be reduced is secured upon the tracing-table, and the operator manually moves the tracer over the surface to be traced, and the movement of the tracer is transmitted through the pantograph heretofore described to the plate 57, which in turn moves on the plate 54 and carries the engraving-tables 62. The engraving-table 62 carries the surface to be engraved preferably clamped between the shoulders 63 and clamp 64 in contact with the engraving instrument or tool 45. As this movement is continued every movement of the tracer is transmitted to the surface to be engraved, which is moved beneath the fixed engraving-tool, but reduced to the proportion required, as one to fifty.

I deem it unnecessary to further elaborate here the pantograph system of reproduction, as this is well understood in the art. It may be desirable, however, for the sake of clearness to trace the movement transmitted from the stylus to the engraving-plate. As the stylus 104 is moved manually in one direction or another its movement is transmitted through the stylus-arm 100 to the suspended lever 80 by the hinged connection formed by the center-bearing points 86. The lever 80 is suspended by the center-bearing points 87 and finds its fulcrum in these points in one motion and in the center-bearing points 76 in a right-angular motion to that last described. Points of fulcrum from which the link 92 derives its motion are the center-bearing points 76 and 76 in one direction and the bearing-points 87 and 87 in the opposite right-angular direction, as already stated, and these several movements are transmitted to the plate 57, which in one direction moves on the plate 54, while in the other right-angular direction it carries the plate 54 with it, and it will be understood that with the movement of the plate 57 the engraving-table 62, carrying the surface to be engraved or traced, is moved in consonance with the movement of the plate 57.

What I claim is—

1. In an engraving-machine the combination with an engraving-table capable of universal movement, of a fixed graving-tool mounted to coöperate with said engraving-table, a suspended lever fulcrumed at two points, a pivoted link connected at one end to the suspended lever between the fulcrum-points and at the other end to the engraving-table, and a tracer carried by said suspended lever.

2. In an engraving-machine the combination with an engraving-table capable of universal movement of a fixed graving-tool mounted to coöperate with said engraving-table, of a suspended lever fulcrumed at two points, said fulcrum-points being relatively adjustable, a pivoted link connected at one end to the suspended lever between the fulcrum-points and at the other to the engraving-table, and a tracer carried by said suspended lever.

3. In an engraving-machine the combination with a stationary support, a plate mounted thereon to move in one direction, and an engraving-table mounted on said plate to move at right angles thereto, of a fixed graving-tool mounted to coöperate with said engraving-table, a suspended lever fulcrumed at two points, a pivoted link connected at one end to the suspended lever between the fulcrum-points and at the other to the engraving-table, and a tracer carried by said suspended lever.

4. In an engraving-machine the combination with a stationary support, a plate mounted thereon to move in one direction and an engraving-table mounted on said plate to move at right angles thereto, of a fixed graving-tool mounted to coöperate with said engraving-table, a suspended lever fulcrumed at two points, said fulcrum-points being relatively adjustable, a pivoted link connected at one end to the suspended lever between the fulcrum-points and at the other end to the engraving-table, and a tracer carried by said suspended lever.

5. In an engraving-machine the combination of an engraving-table mounted on a series of balls running in grooves relatively at right angles, a plurality of tools mounted to coöperate with said engraving-table, a suspended lever fulcrumed at two points carrying a tracer and a link connecting the suspended lever and the engraving-table, said link being connected to the suspended lever between the fulcrum-points, substantially as described.

6. In an engraving-machine the combination of an engraving-table mounted on a series of balls running in grooves relatively at right angles, a plurality of tools mounted to coöperate with said engraving-table, a suspended lever fulcrumed at two points, said fulcrum-points being relatively adjustable, said suspended lever carrying a tracer and a link connecting the suspended lever and the engraving-table, said link being connected to the suspended lever between the fulcrum-points.

7. In an engraving-machine the combination of an engraving-table mounted on a series of balls running in grooves relatively at right angles, a plurality of tools mounted to coöperate with said engraving-table, a suspended lever carrying a tracer and provided with adjustable fulcrum-points and a link connecting the lever and the engraving-table, said link being connected to the suspended lever between the fulcrum-points substantially as described.

8. In an engraving-machine, a supporting-bracket, a plate mounted thereon by means of a system of balls running in grooves on said bracket and adapted to move in one direction, an engraving-table mounted on said plate by means of a system of balls running in grooves on said plate and adapted to move at right angles to the movement of the plate, a tool coöperating with the engraving-table, a tracer connected with a suspended lever, said lever having relatively adjustable fulcrums and a link connecting said lever and the engraving-table, said link being connected to the suspended lever between the fulcrum-points substantially as described.

9. In an engraving-machine the combination with an engraving-table having on its under side ways, a plate with ways on its upper side and ways on its under side, and a suitable support for said plate and table also having ways, the ways in the support and the under side of the plate being parallel and the ways in the upper side of the plate and the under side of the table being parallel, the ways between the table and the plate being at right angles to the ways between the plate and the support, ball-bearings interposed in such ways, of an engraving-tool mounted to coöperate with the engraving-table, a suspended lever carrying a tracer, said lever having relatively adjustable fulcrums and a link connecting said lever to said engraving-table, said link being connected to the suspended lever between the fulcrum-points, substantially as described.

10. A lever and connections mounted as follows: a bracket with a head having center bearings, a frame mounted on said heads with center-bearing points, a collar having center bearings adjustably mounted on said frame, a bifurcated suspended lever connected to said collar by center bearings a plate adjustably mounted on said suspended lever and having center bearings, and a link connected to said plate by center bearings, substantially as described.

11. In an engraving-machine a suspended lever fulcrumed at two points, and connected between said fulcrums to a universally-movable engraving-table, and connected at the free end to a tracer-point, with means to adjust and change the points of fulcrum with reference to each other, substantially as described.

12. In an engraving-machine, a vertical lever bifurcated at both ends with center-bearing points in each bifurcation and slots in the upper bifurcated arms, a supporting-bracket with a head and bearings in the head, a frame carrying two center-bearing points pivoted on the head of the bracket, an adjustable collar having bearings, mounted on the frame, a plate adjustably secured to the upper bifurcated end of said lever in said slot, said plate having bearings, a link having two bifurcated ends, one end being pivotally connected to said plate, and the other end to a block, a bifurcated frame pivotally connected to said block at right angles to said link connection to the same block, and said frame being connected to an adjustable engraving-table; an arm pivotally connected to the lower bifurcated end of said suspended lever, within said bifurcation, said arm also carrying a tracing-point at the other end thereof, substantially as described.

13. In an engraving-machine a vertical lever and connections jointed to move in right-angular planes, and forming together a universal-joint connection, said lever connected near one end with an engraving-table, mounted to have a universal movement, and connected at the other end to a tracer, a bracket having a head, and having a frame pivoted to said head, with an adjustable collar mounted on said frame to which is hinged one end of the vertical lever, so that by the adjustment of the collar on the frame, the position of fulcrum of the suspended lever may be brought into or away from the plane of the bracket-head-joint connection; a plate pivotally jointed to the lever by a link, said link being adjustably mounted on the vertical lever, so that the plane of its jointed movement may be brought into or out of the plane of the movement of the vertical lever in both right-angular directions, and so that it may be adjusted with reference to either or both of the same, substantially as described.

14. In an engraving-machine the combination with a pattern-table, a graving-tool and a carriage on which said tool is mounted, both said table and carriage being suitably mounted to move in parallel ways, a screw and gears connecting said table and carriage to move the carriage in consonance with the movement of the table with a degree of movement proportional to the difference between the size of the original work to be reproduced and the reproduced work.

15. In an engraving-machine a pattern-table and a carriage on which the graving-tool is mounted, both said table and carriage being mounted to move in ways in combination with a shaft suitably journaled and having thereon a screw-thread and at one end a beveled gear, a rack on the under side of the table, a driving-shaft suitably mounted carrying a pinion engaging said rack and a beveled gear; a train of shafting and beveled gears connecting the beveled gear of the screw-shaft and that of the driving-shaft, and means to revolve the driving-shaft, and a screw-threaded bracket secured to the carriage and engaging the screw-thread of the screw-threaded shaft, substantially as described.

16. In an engraving-machine a pattern-table provided with means to move the same, a graving-tool carriage suitably mounted to move in ways parallel with the movement of the pattern-table, and means to move said carriage in consonance with the movement of the table according to the degree of reduction required in reducing the matter traced to the size of the matter to be reproduced, said carriage being provided on its upper surface with dovetailed ways adapted to receive the dovetailed tongue of suitable supporting-blocks, and means to fix the said supporting-blocks in said ways; a supporting-arm pivotally connected with each of said blocks at one end and carrying the graving-tool at the other end, said arms projecting eccentric to the axis of their pivotal mounting, substantially as described.

17. In an engraving-machine, a carriage suitably mounted in ways, and a pattern-table similarly mounted, both said table and carriage having a parallel motion, and means to move the same together, the degree of the movement of the carriage being dependent upon the degree of reduction from the work traced to the size of the work to be reproduced; beveled grooves in said carriage adapted to receive blocks having beveled tongues; set-screws to secure said blocks to the carriage; center bearings in said blocks; arms adapted to carry the graving-tool at one end and be pivotally secured to said blocks at the other end by center bearings, the arms extending from the blocks at an angle to the plane of the axis of their journal-bearings; a shaft suitably mounted in journal-bearings; said journal-bearings being eccentric to the axis of said shafts, and said shafts lying beneath the arms supporting the graving-tool in such relation that when the shafts are rocked, moving eccentric to their axis they will lift the arms carrying the graving instruments, and raise the graving instruments off of the engraving-table; levers secured to said shaft, and a connecting-rod adapted to depress said lever to rock said shaft, substantially as described.

18. In an engraving-machine an engraving-table suitably mounted to have a universal movement in a horizontal plane, a link pivotally connected at one end to said table by a universal joint, a suspended lever having adjustable fulcrums mounted on a bracket by a universal-joint system, the other end of the link being pivotally connected with the upper end of such suspended lever between said fulcrums; a guide-arm pivotally connected to the lower end of said suspended lever at one end thereof, and carrying at the other end a tracer-point, substantially as described.

Signed by me at New York, N. Y., this 6th day of November, 1899.

WILLIAM S. EATON.

Witnesses:
EMMA W. FINLAYSON,
THOMAS P. DALTON.